United States Patent [19]

Onken

[11] Patent Number: 5,718,220
[45] Date of Patent: Feb. 17, 1998

[54] TRUCK BODY FOR ON-SITE HEATING AND COLLECTING WASTE GREASE FROM DIFFERENT SIZED CONTAINERS

[76] Inventor: Donald R. Onken, P.O. Box 72, Easton, Ill. 62633

[21] Appl. No.: 508,426

[22] Filed: Jul. 31, 1995

[51] Int. Cl.⁶ ............................................. F24H 9/00
[52] U.S. Cl. ............................... 126/343.5 A; 126/385; 126/836
[58] Field of Search ............................... 126/386, 385, 126/343.5 R, 343.5 A

[56] References Cited

U.S. PATENT DOCUMENTS

| | | | |
|---|---|---|---|
| 1,228,108 | 5/1917 | Gologan | 126/386 |
| 1,422,156 | 7/1922 | Wever | 126/386 |
| 1,462,275 | 7/1923 | Gammel | 126/386 |
| 4,450,828 | 5/1984 | Onken et al. | 126/343.5 |
| 4,485,801 | 12/1984 | Hodges et al. | 126/386 |
| 5,033,453 | 7/1991 | Loyd et al. | 126/386 |

FOREIGN PATENT DOCUMENTS 677 of 1887 United Kingdom ............. 126/386

*Primary Examiner*—Carl D. Price
*Attorney, Agent, or Firm*—Edwin E. Greigg; Ronald E. Greigg

[57] ABSTRACT

An improved container for heating grease in a truck including a waste grease holding tank and a heating tank for immersion of a waste grease container into a vat of hot water for loosening the grease in the waste grease container so that the grease in the waste grease container can be dumped into the grease holding tank of the truck. The vat of hot water includes three double walled sides in which an upper edge of the double walls include a plurality of spaced hot water inlet apertures and the bottom of the double wall include fewer smaller drain apertures. The same three sides include hot water flow areas through which hot water flows in order to heat water in the heating tank. The double-walled sides for chambers which receive overflow hot water when a large waste grease container is placed in the vat. These chambers prevent spilling the hot water over the edges of the tank. When the waste grease container is removed the hot water seeks its own level by the water in chambers of the double walls leaking out through the small outlet apertures at the bottom of the double wall. The vat thus recycles hot water for future use in loosening grease in other waste grease containers.

4 Claims, 2 Drawing Sheets

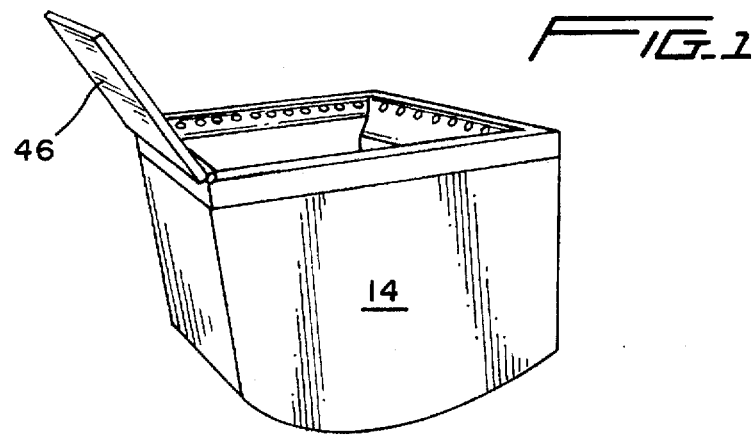
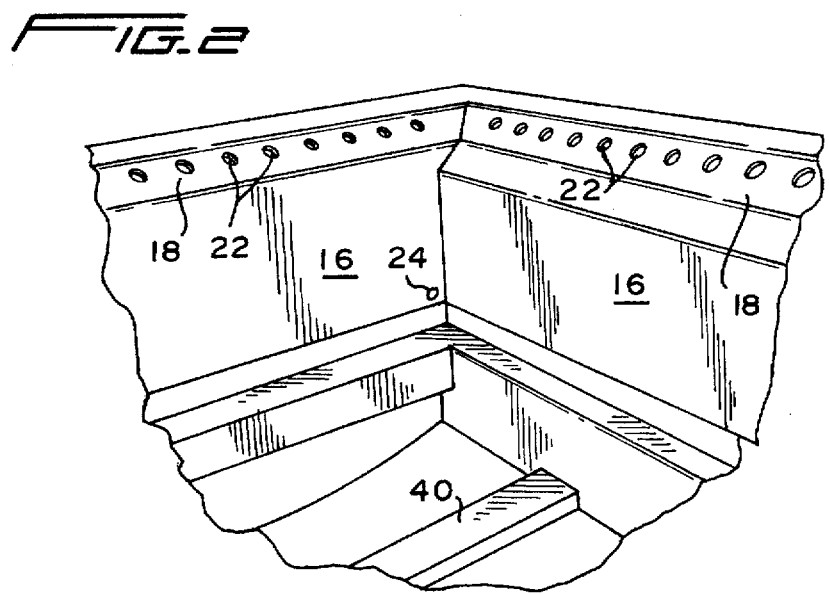
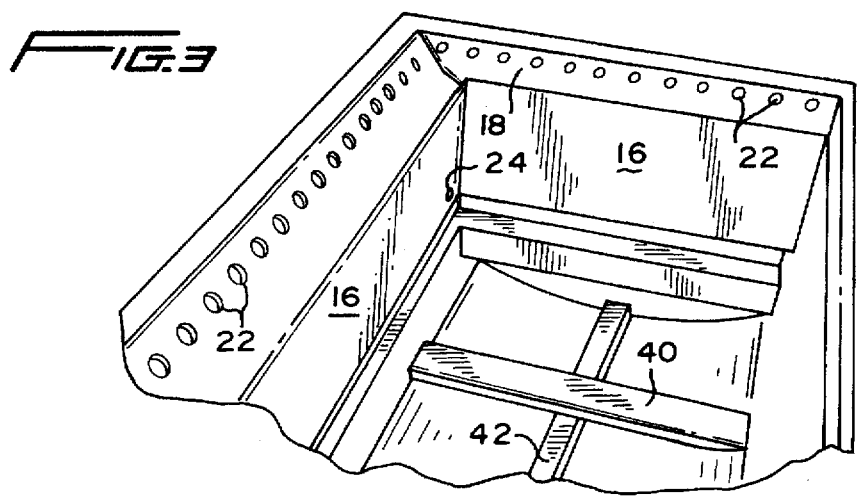

TRUCK BODY FOR ON-SITE HEATING AND COLLECTING WASTE GREASE FROM DIFFERENT SIZED CONTAINERS

BACKGROUND OF THE INVENTION

This invention is an improvement over U.S. Pat. No. 4,450,828, which is used for collecting waste grease products and heating the grease during transport so that the grease can be maintained in a flowable state for ease of dumping from the collection truck.

It has become customary in the trade to provide different sized containers so that customers may select a size compatible with their needs for the amount of waste grease requiring disposal.

U.S. Pat. No. 4,450,828 is directed to a truck which collects grease from such grease containers by elevating, then dripping and finally dumping the grease container into a collection tank on the truck, so that the container can be used to collect more grease on the premises where it is stored.

This invention is directed to an improved tank truck for on-site collecting and heating of waste grease from differently sized containers and more particularly defines improvements over U.S. Pat. No. 4,450,828 issued May 29, 1984, which is incorporated herein by reference.

A review of the method of use of the prior art grease truck is appropriate here. As set forth in U.S. Pat. No. 4,450,838, a container is left at a place of business for collecting waste grease. Periodically a truck such as set forth in U.S. Pat. No. 4,450,828 will arrive at the place of business to collect the waste grease from the container and then leave the container at the place of business for collecting more waste grease. By use of such a truck to collect the waste grease, the container always remains at the restaurant or collection site. In collecting the waste grease, the collection truck backs-up close to the waste grease container, lifts the waste grease container and lowers the waste grease container into a hot-water-bath vat. The waste grease container is heated by the hot-water bath so that the grease along the inner surfaces of the container becomes soft and the waste grease container is then lifted from the vat and moved above a grease holding tank on the truck and is then dumped from the collection container into the waste grease holding tank on the truck body. The waste grease collection container is then removed from the truck and placed back onto the ground. The waste grease collection truck can then proceed to another waste grease collection site to collect additional waste grease. In this process, the waste grease collection container remains at the collection site. This avoids the problems of the historic collection method which required an exchange of collection containers, such as barrels, as was used prior to the invention of the prior art collection truck.

In the process of waste grease collection by the prior art truck set forth in U.S. Pat. No. 4,450,828, a problem exists in handling differently sized containers. As set forth above, the truck includes a hot-water-bath vat in which a certain amount of hot water is contained in order to melt the grease at least along the inner surfaces of the collection container when it is immersed in the hot water vat. It has been determined that when the largest waste containers are immersed in the hot-water-bath vat that some of the water would spill from the vat and be lost which would leave insufficient hot water to treat the smaller sized containers as the truck continued on its collection rounds, thus requiring the operator to partially refill the vat.

In essence, the truck hot-water-bath vat can now hold sufficient water to immerse and liquify grease in the smallest sized container, which displaces relatively little water, and yet accommodates the largest container without wasting the heated water by overdisplacement.

It is therefore an object of the present invention to provide a hot-water-bath vat in a truck body in which no hot water is wasted regardless of the size of the waste grease collection container immersed in the hot-water-bath vat.

Another object is to provide a hot-water-bath vat adapted to store the water displaced when large collection containers are immersed in the vat any excess hot water is not lost.

Still another object is to provide a hot-water-bath vat in a truck body in which the hot-water-bath vat is double-walled so that any over-flow of hot water will spill into the double-walled area and be saved for re-use.

Other objects and advantages of the invention will become obvious from the claims and upon viewing the drawings.

BRIEF DESCRIPTION OF THE DRAWINGS

FIG. 1 is a perspective view of a hot-water-bath vat which is assembled for installing in a truck body;

FIGS. 2 and 3 illustrate two different partial inside views;

DETAILED DESCRIPTION OF THE PREFERRED EMBODIMENT

Figure 4:
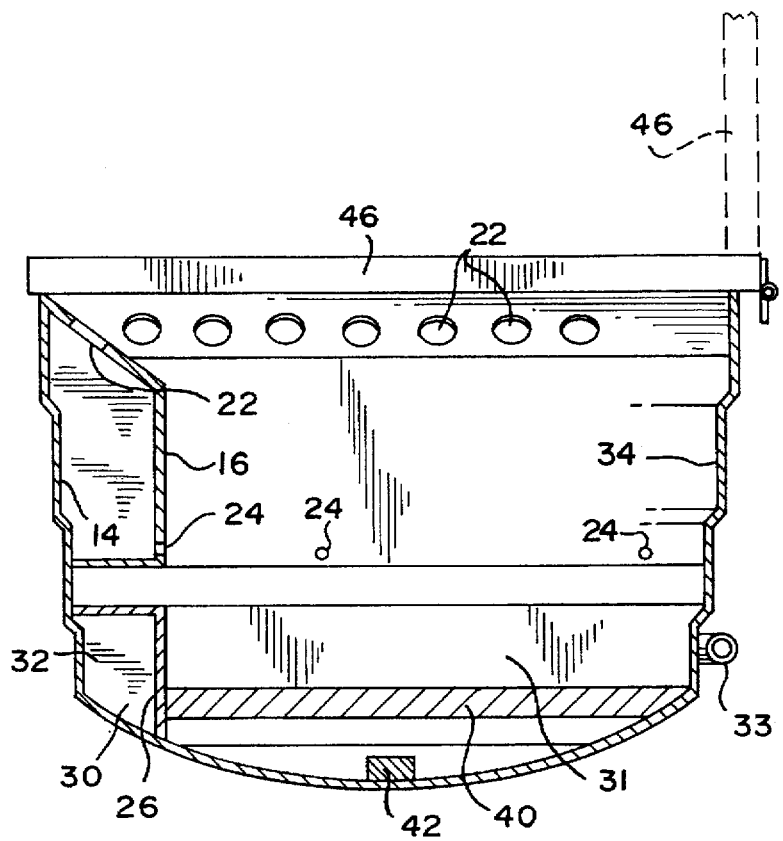
FIG. 4 illustrates a cross-sectional view illustrating one of the double-walled sides.

Now referring to the drawing there is shown a hot-water-bath vat or tank mountable within a truck body, not shown, for heating a waste grease container in order to loosen the waste grease from the sides of the container so that the waste grease can be dumped into a holding tank in the truck body such as set forth in U.S. Pat. No. 4,450,828. As shown, the tank is generally rectangular in shape with a somewhat rounded bottom 12. The tank is made with an outer shell including walls 14 and an inner shell including walls 16 with a space between the shells. The upper end 18 of the inner shell is sloped downwardly at an angle and the upper edge of the inner shell is welded along its periphery 20 to the upper end of the outer shell to enclose the inner and outer shells. As shown, the sloped portion of the inner shell is provided with spaced apertures 22 the purpose of which will be explained shortly.

The amount of water required for the tank would depend upon the size of the smallest and largest size waste grease collection container and the size of the hot-water-bath vat. The vat only needs to be a little larger than the largest waste grease collection container. If the waste grease collection truck is to be used in a cold climate, then the water should include an antifreeze solution to prevent the water from freezing when the truck is not in use. The water can be heated by use of the water cooling circulation system of the truck engine; therefore, the hot-water-bath vat would be connected with the water cooling system of the truck via a plumbing system of known type. The water can be heated by a separate heater fueled by diesel fuel and circulated through channels along the front and two ends of the hot-water bath vat. FIG. 4 illustrates a cross section of the vat which shows a hot water channel 30 along the front wall and a hot water channel 31 along the end wall shown. The hot water channels are formed along the front wall and the two end walls. No hot water channel is provided along the back wall. The water is heated by the truck water circulation system or by a separate heater and fed to the channel 30 along the front wall and the channel along one side wall. The water in the channel along the front wall is fed to the channel along the opposite end wall not shown in FIG. 4. From the channel along the end wall not shown, the water is fed into a return pipe 33 or an appropriate hose and returned to an expansion tank, not shown. The water flowing in the channel 31 of the end wall shown in FIG. 4 is also fed into the return pipe or hose. From the expansion tank the water is fed back to the heater. Therefore, there is a complete circuit for the hot water. The heated circulated hot water heats the vat bath water in the tank so that when a grease container is placed in the hot-water-bath vat the grease will be softened along the walls of the grease container and can be dumped into the grease holding tank of the truck.

In a preferred embodiment, the hot water bath is mounted in the rear of the truck and the tank in the front. In an alternative embodiment, the arrangement could be reversed.

FIG. 4 is a cross sectional view of the hot-water-bath vat illustrating the double wall area along the front wall and the heating hot water channel 30 through which heated hot water flows. The double wall construction is formed along the front wall and the two end walls, but not along the back side wall. As shown, an inner wall structure 16 is welded in place toward the upper end of the tank. The inner wall structure has a sloping upper surface 18 which slopes downward toward the inner area of the vat. The sloping upper surface is provided with apertures 22 and the bottom of the double wall area is provided with smaller outlet openings 24. The inlet apertures 22 are much larger than the outlet apertures and also there are more of them.

Figure 5:
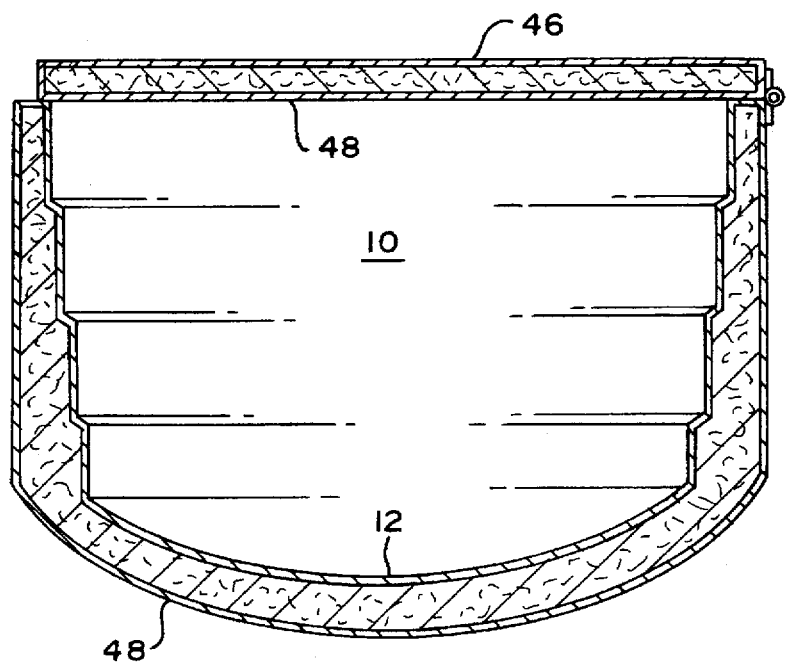
FIG. 5 illustrates an end view showing foam insulation which surrounds the tank on all sides and the top.

One or more support cross pieces 40 are secured in the bottom of the vat from the front side to the back side in order to assist in supporting the vat structure. These supports are preferably placed below the supporting ridge which supports the grease container. The bottom surface 12 of the hot-water-bath vat is somewhat curved or rounded in cross-section and is provided with a slosh plate 42 along its length to assist in cutting down stress on the inner walls due to water sloshing when the truck is moving. The cross supports 40 secured across the bottom will assist in decreasing sloshing from end-to-end of the vat. The vat is closed by a door 46 which is hinged at the back edge to the back wall and is provided with a closure means at the front edge. Since the vat contains water that is heated, the entire tank is provided on its outer surface with some type of heat insulation 48 such as four inches of foam, as shown in FIG. 5. The door or cover is also insulated to prevent heat from escaping.

In operation, the waste grease collection truck includes an elongated body which includes the hot-water-bath vat at one end and a much larger waste grease holding tank at the opposite end. The truck body can be made with the hot-water-bath vat at either end and is provided with a hydraulic lift and hydraulically operated closure doors. The hydraulic lift elevates a waste grease collection tank upwardly over the hot-water-bath vat and with the cover over the vat open, the waste grease container is lowered into the hot-water-bath vat. The hot water loosens or melts the grease along the inner surfaces of the waste grease collection container in two to three minutes, then the waste grease container is lifted from the hot-water-bath vat, the door over the waste grease collection tank of the truck is opened and the loosened waste grease in the waste grease collection container is dumped into the waste grease holding tank on the truck.

The amount of water maintained in the hot-water-bath vat is sufficient to rise to just below the upper edge of the smallest type waste grease collection tank so that the waste grease will be loosened. In the event one of the largest type of waste grease collection tanks is used, the upper end of the largest tank will protrude slightly above the upper edge of the hot-water-bath vat and the hot water will rise toward the upper edge of the large waste grease collection tank and, instead of flowing over the edge of the vat as in the prior art truck, the water will flow into the apertures along the downwardly sloping upper surface of the inner shell. The inner shell is provided with drain holes at the bottom of the walls so that water can drain from the holding area between the inner and outer shells back into the vat. When a large tank is lowered into the hot-water-bath vat, the drain holes at the bottom of the inner shell act as restrictions so that the water rises faster on the inside of the inner shell than within the spacing between the inner and outer shells; therefore, the water will flow upwardly and flow into the apertures in the downwardly sloping upper end of the inner shell. The amount of water in the vat is limited to an amount that would fill the inner shell and the spacing between the inner and outer shells without any overflow when the large waste grease collection container is lowered into the hot-water-bath vat. Thus, the improved hot-water-bath vat prevents wasting any of the hot-water when heating the largest type waste grease collection container, and avoids the need for intermediate refilling of the vat with water every time a larger container is heated prior to dumping. After the grease container is removed from the vat, the hot water in the vat will seek its own level by the water between the walls or shells leaking from the outlet water apertures back into the vat.

The foregoing relates to preferred exemplary embodiments of the invention, it being understood that other variants and embodiments thereof are possible within the spirit and scope of the invention, the latter being defined by the appended claims.

What is claimed:

1. In a waste grease collection system including a truck-mounted grease collection tank, a lift means for handling and dumping individual on-site grease collection containers into said grease collection tank, and an intermediate stage heating tank into which said on-site grease collection containers are deposited temporarily to liquify grease along side surfaces of containers held therein in order to facilitate dumping the contents thereof into said collection tank, and for on-site collection containers of different sizes, the improvement in which said heating tank is of double wall construction including an outer wall and an inner wall spaced from said outer wall, said inner wall having an upper end secured to an inner surface of said outer wall along, a line below an upper edge of said outer wall, a chamber between the outer and inner walls thereof and water inlet means through which excess water flows into said chamber when a large on-site collection container is lowered into said heating tank, whereby the water in said heating tank is not lost and is recyclable to allow servicing multiple sizes of on-site collection containers without manual refilling.

2. The waste grease collection system claimed in claim 1, in which, said inner wall has a downwardly slanted upper wall portion which slants toward the inner chamber to ease the deposit of an on-site collection container into said heating tank.

3. The waste grease collection system claimed in claim 2, including the further improvement that said downwardly slanted upper wall portion includes said water inlet means and a lower wall portion of said inner wall includes water outlet means which are smaller in size than those of the inlet means.

4. The waste grease collection system claimed in claim 3, wherein said inlet means and said outlet means comprise means defining apertures in said inner wall.

* * * * *